United States Patent
Yu et al.

(10) Patent No.: US 11,199,524 B2
(45) Date of Patent: Dec. 14, 2021

(54) NETWORK WAVEFIELD IMAGING METHODS FOR QUANTIFICATION OF COMPLEX DISCONTINUITY IN PLATE-LIKE STRUCTURES

(71) Applicant: UNIVERSITY OF SOUTH CAROLINA, Columbia, SC (US)

(72) Inventors: Lingyu Yu, Columbia, SC (US); Zhaoyun Ma, Columbia, SC (US); Wenfeng Xiao, Columbia, SC (US); Zhenhua Tian, Durham, NC (US)

(73) Assignee: University of South Carolina, Columbia, SC (US)

( * ) Notice: Subject to any disclaimer, the term of this patent is extended or adjusted under 35 U.S.C. 154(b) by 188 days.

(21) Appl. No.: 16/432,159

(22) Filed: Jun. 5, 2019

(65) Prior Publication Data
US 2019/0383773 A1    Dec. 19, 2019

Related U.S. Application Data

(60) Provisional application No. 62/686,888, filed on Jun. 19, 2018.

(51) Int. Cl.
*G01N 29/06* (2006.01)
*G01N 29/24* (2006.01)

(52) U.S. Cl.
CPC ....... *G01N 29/069* (2013.01); *G01N 29/2418* (2013.01); *G01N 2291/0234* (2013.01);
(Continued)

(58) Field of Classification Search
CPC ... G01N 2291/2632; G01N 2291/0289; G01N 2291/0234; G01N 2291/017;
(Continued)

(56) References Cited

U.S. PATENT DOCUMENTS 4,550,607 A    11/1985  Maslak
6,996,480 B2    2/2006  Giurgiutiu et al.
(Continued)

FOREIGN PATENT DOCUMENTS

JP    2000275225 A  * 10/2000

OTHER PUBLICATIONS

Ambrozinski et al. "Efficient Tool for Designing 2d Phased Arrays in Lamb Waves Imaging of Isotropic Structures" *J Intell. Mater. Syst. Struct.* 26(17) (2014) pp. 2283-2294.
(Continued)

*Primary Examiner* — Tarun Sinha
(74) *Attorney, Agent, or Firm* — Dority & Manning, P.A.

(57) ABSTRACT

Network wavefield imaging methods are able to image significantly complex discontinuities or shapes in plate-like structures for superior ultrasonic structural health monitoring (SHM)/nondestructive evaluation (NDE). The imaging provides high-resolution location, shape and/or size images of a structure, and for discontinuities with more complicated profiles. Guided wave (GW) network wavefield imaging methods combine tomography and wavefield/wavenumber imaging algorithms. Metallic plate damage detection uses guided ultrasonic waves and non-contact laser vibrometry. Guided waves are generated by piezoelectric transducers (PZT). A non-contact scanning laser Doppler vibrometer (SLDV) measures the full velocity plate guided wave wavefields. Developed network wavefield imaging algorithms account for multiple-actuator excitations from different angles enclosing the discontinuity, with algorithms using intrinsic wave characteristics such as wavefield, wavenumber, or reconstructed wave energy. Determined locations, sizes and shapes of highlighted areas in wavefield, wavenumber and/or filter reconstructed energy-based images
(Continued)

correlate with location, size and shape of damage in metallic plates.

39 Claims, 6 Drawing Sheets

(52) U.S. Cl.
CPC .............. *G01N 2291/0289* (2013.01); *G01N 2291/2632* (2013.01)

(58) Field of Classification Search
CPC ..... G01N 2291/0425; G01N 2291/106; G01N 2291/0258
USPC .......................................................... 73/603
See application file for complete search history.

(56) References Cited

U.S. PATENT DOCUMENTS

| | | | |
|---|---|---|---|
| 7,469,595 B2 | 12/2008 | Kessler et al. | |
| 7,881,881 B2 | 2/2011 | Giurgiutiu et al. | |
| 9,638,671 B2 | 5/2017 | Borigo et al. | |
| 2009/0048789 A1 | 2/2009 | Yu et al. | |
| 2010/0042338 A1 | 2/2010 | Giurgiutiu et al. | |
| 2015/0148655 A1* | 5/2015 | Haupt ...................... | A61B 8/10 600/407 |
| 2016/0374555 A1* | 12/2016 | Kontiola ................ | A61B 3/165 600/400 |
| 2017/0219532 A1 | 8/2017 | Yu et al. | |

OTHER PUBLICATIONS

Balanis, C.A. (2005), Antenna Theory: Analysis and Design—Chapter 6: Arrays: Linear, Planar, and Circular John Wiley & Sons, Inc. (2005) pp. 290-332.
Checkovich, P. "Time-Gain Control Sharpens Ultrasound" *Design News* Aug. 3, 1998.
Chen, et al. "Design of Distributed Sparse Arrays for Lamb Wave SHM Based Upon Estimated Scattering Matrices" *AIP Conf. Proc.* 1581(1) (2014) pp. 248-255.
Clarke, et al. "Evaluation of the Damage Detection Capability of a Sparse-Array Guided-Wave SHM System Applied to a Complex Structure under Varying Thermal Conditions" *IEEE Trans. Ultrason. Ferroelectr. Freq. Control* 56 (2009) pp. 2666-2678.
Clay, et al. "Experimental Study of Phased Array Beam Steering Characteristics" *J Nondestr. Eval.* 18(2) (1999) pp. 59-71.
Crawley, et al. "Use of Piezoelectric Actuators as Elements of Intelligent Structures" *AIAA* 25(10) (1987) pp. 1373-1385.
De Marchi, et al. "A Sparsity Promoting Algorithm for Time of Flight Estimation in Guided Waves-Based SHM" *7th European Workshop on Structural Health Monitoring* (2014) pp. 583-590.
Deutsch, et al. "Focusing of Rayleigh Waves: Simulation and Experiment" *IEEE Trans. Ultrason. Ferroelectr. Freq. Control* 46(2) (1999) pp. 333-340.
Deutsch, et al. "Defect Detection with Rayleigh and Lamb Waves Generated by a Self-Focusing Phased Array" *Nondestructive Testing* 3(12) (1998) pp. 1-6.
Deutsch, et al. "Self-Focusing of Rayleigh Waves and Lamb Waves with a Linear Phased Array" *J. Research Nondestr. Eval.* 9(2) (1997) pp. 81-95. (Abstract only).
Engholm, et al. "Direction of Arrival Estimation of Lamb Waves Using Circular Arrays" *Struct. Health Monitoring* 10 (2011) pp. 467-480.
Engholm, et al. "Imaging and Suppression of Lamb Modes Using Adaptive Beamforming" *Smart Mater. Struct.* 20:085024 (2011) pp. 1-13.
Fink, M. "Time-reversal mirrors" *J. Phys. D: Appl. Phys.* 26 (1993) pp. 1333-1350.

Freeman, et al. "Delta-Sigma Oversampling Ultrasound Beamformer with Dynamic Delays" *IEEE Trans. Ultrason. Ferroelectr. Freq. Control* 46(2) (1999) pp. 320-332.
Fromme, et al. "On the Development and Testing of a Guided Ultrasonic Wave Array for Structural Integrity Monitoring" *IEEE Trans. Ultrason. Ferroelectr. Freq. Control* 53 (2006) pp. 777-785.
Fromme, et al. "A Guided Ultrasonic Waves Array for Structural Integrity Monitoring" *Quant. Nondestr. Eval.* 24 (2005) pp. 1780-1787.
Giridhara, et al. "Rapid Localization of Damage Using a Circular Sensor Array and Lamb Wave Based Triangulation" *Mech. Syst. Signal Proc.* 24 (2010) pp. 2929-2946.
Giurgiutiu, et al. "Enhanced Composites Integrity through Structural Health Monitoring" *Applied Composite Materials* 19 (2012) pp. 813-829.
Giurgiutiu, et al. "Structural health monitoring with piezoelectric wafer active sensors" *AIAA* 49(3) (2011) pp. 565-581.
Giurgiutiu, V. "Structural health monitoring with piezoelectric wafer active sensors" *Academic Press* (2008).
Giurgiutiu, et al. "Embedded-Ultrasonics Structural Radar for in Situ Structural Health Monitoring of Thin-Wall Structures" *Struct. Health Monitoring* 3 (2004) pp. 121-140.
Glushkov, et al. "Group Velocity of Cylindrical Guided Waves in Anisotropic Laminate Composites" *J. Acoust. Soc. Am.* 135(1) (2014) pp. 148-154.
Hale, J. "Boeing 787 from the Ground Up" *AERO* QTR04 (2006) pp. 17-23.
Hall, et al. "Minimum Variance Ultrasonic Imaging Applied to an in situ Sparse Guided Wave Array" *IEEE Trans. Ultrason. Ferroelectr. Freq. Control* 57(10) (2010) pp. 2311-2323.
Hay, et al., "A comparison of embedded sensor Lamb wave ultrasonic tomography approaches for material loss detection" *Smart Mater. Struct.* 15(4) (2006) pp. 946-951.
Higuti, et al. "Damage Characterization Using Guided-Wave Linear Arrays and Image Compounding Techniques"*IEEE Trans. Ultrason. Ferroelectr. Freq. Control* 57 (2010) pp. 1985-1995.
Huthwaite, et al. "High-Resolution Guided Wave Tomography" *Wave Motion* 50 (2013) pp. 979-993.
Jarmer, et al. "Multi-Wave-Mode, Multi-Frequency Detectors for Guided Wave Interrogation of Plate Structures" *Struct. Health Monitor.* 13 (2014) pp. 120-130.
Johnson, et al. "Array Signal Processing: Concepts and Techniques—Chapter 4: Beamforming" *Prentice-Hall Inc.* (1993) pp. 112-117.
Kannajosyula, et al. "Analysis of Annular Phased Array Transducers for Ultrasonic Guided Wave Mode Control" *Smart Mater. Struct.* 22:085019 (2013) pp. 1-14.
Keilers, et al. "Identifying Delamination in Composite Beams Using Built-in Piezoelectrics: Part I—Experiments and Analysis" *J. Intell. Mater. Sys. Struct.* 6(5) (1995) pp. 649-663.
Keilers, et al. "Identifying Delamination in Composite Beams Using Built-in Piezoelectrics: Part II: An Identification Method" *J. Intell. Mater. Sys. Struct.* 6(5) (1995) pp. 664-672.
Kim, et al. "Guided Wave Beamsteering Using Mfc Phased Arrays for Structural Health Monitoring: Analysis and Experiment" *J. Intell. Mater. Sys. Struct.* 21 (2010) pp. 1011-1024.
Kirk, et al. "Ultrasonic Arrays for Monitoring Cracks in an Industrial Plant at High Temperatures" *IEEE Trans. Ultrason. Ferroelectr. Freq. Control* 46(2) (1999) pp. 311-319.
Kirk, et al. "An array-based system for monitoring cracks in industrial plant at high temperatures" *Insight* 38 (1996) pp. 722-727.
Koduru, et al. "Phased Annular Array Transducers for Omnidirectional Guided Wave Mode Control in Isotropic Plate Like Structures" *Smart Mater. Struct.* 22:125022 (2013) pp. 1-8.
Koduru, et al. "Mode Controlled Guided Wave Tomography Using Annular Array Transducers for SHM of Water Loaded Plate Like Structures" *Smart Mater. Struct.* 22:125021 (2013) pp. 1-10.
Kwon, et al. "Beam Pattern Improvement by Compensating Array Nonuniformities in a Guided Wave Phased Array" *Smart Mater. Struct.* 22:085002 (2013) pp. 1-10.
Lalande, et al. "Impedance-Based Modelling of Induced Strain Actuators Bonded on Ring Structures" *J. Sound Vibr.* 201(2) (1997) pp. 169-187.

(56) References Cited

OTHER PUBLICATIONS

Leleux, et al. "Long Range Detection of Defects in Composite Plates Using Lamb Waves Generated and Detected by Ultrasonic Phased Array Probes" *J. Nondestr. Eval.* 32 (2013) pp. 200-214.
Leonard, et al. "Lamb Wave Tomography of Pipe-Like Structures" *Ultrasonics* 43 (2005) pp. 574-583.
Leonard, et al. "Ultrasonic Lamb wave tomography" *Inverse Problems* 18(6) (2002) pp. 1795-1808.
Levine, et al. "Model-Based Imaging of Damage with Lamb Waves Via Sparse Reconstruction" *J. Acoust. Soc. Am.* 133(3) (2013) pp. 1525-1534.
Li, et al. "Implementing Guided Wave Mode Control by Use of a Phased Array Transducer" *IEEE Trans. Ultrason. Ferroelectr. Freq. Control* 48(3) (2001) pp. 761-768.
Lines, et al. "Optimization of High-Frequency Array Technology for Lap-Joint Inspection" *Proc. 3rd Joint FAA/DoD/NASA Conf. Aging Aircraft* (1999) pp. 1-10.
Malinowski, et al. "A Phased Array-Based Method for Damage Detection and Localization in Thin Plates" *Struct. Health Monitor.* 8 (2009) pp. 5-15.
Michaels, et al. "Frequency-Wavenumber Domain Analysis of Guided Wavefields" *Ultrasonics* 51 (2011) pp. 452-466. (Abstract only).
Michaels, J.E. "Detection, localization and characterization of damage in plates with an in situ array of spatially distributed ultrasonic sensors" *Smart Mater. Struct.* 17(3):035035 (2008) pp. 1-15.
Michaels, et al. "Guided wave signal processing and image fusion for in situ damage localization in plates" *Wave Motion* 44(6) (2007) pp. 482-492.
Moetakef, et al. "Elastic Wave Generation by Piezoceramic Patches" *AIAA Journal* 34(10) (1996) pp. 2110-2117.
Nayfeh, A.H. "Wave Propagation in Layered Anisotropic Media" *Elsevier* (1995).
Ostachowicz, et al. "Damage Localisation in Plate Like Structures Based on PZT Sensors" *Mechan. Syst. Signal Proc.* 23 (2009) pp. 1805-1829.
Osterc, et al. "Phased Array Beamsteering in Composite Laminates for Guided Wave Structural Health Monitoring" *ASME 2013 Conference on SMASIS* 2013-3024 (2013) pp. 1-6.
Park, et al. "Time reversal active sensing for health monitoring of a composite plate" *J Sound Vibr.* 302 (2007) pp. 50-66.
Poularikas, A.D. "The Handbook of Formulas and Tables for Signal Processing—Chapter 15: The Hilbert Transform" *CRC Press LLC* (1999).
Prado, et al. "Lamb Mode Diversity Imaging for Non-Destructive Testing of Plate-Like Structures" *NDT&E Intl.* 59 (2013) pp. 86-95.
Prasad, et al. "Structural Health Monitoring of Composite Structures Using Lamb Wave Tomography" *Smart Mater. Struct.* 13 (2004) pp. N73-N79.
Purekar, et al. "Damage Detection in Thin Composite Laminates Using Piezoelectric Phased Sensor Arrays and Guided Lamb Wave Interrogation" *J. Intell. Mater. Sys. Struct.* 21 (2010) pp. 995-1010.
Purekar, et al. "Directional Piezoelectric Phased Array Filters for Detecting Damage in Isotropic Plates" *Smart Mater. Struct.* 13 (2004) pp. 838-850.
Rajagopalan, et al. "A Single Transmitter Multi Receiver (STMR) PZT Array for Guided Ultrasonic Wave Based Structural Health Monitoring of Large Isotropic Plate Structures" *Smart Mater. Struct.* 15 (2006) pp. 1190-1196.
Rajagopalan, et al. "A Phase Reconstruction Algorithm for Lamb Wave Based Structural Health Monitoring of Anisotropic Multilayered Composite Plates" *J. Acoust. Soc. Am.* 119 (2006) pp. 872-878.
Romanoni, et al. "Two-Dimensional Periodic Actuators for Frequency-Based Beam Steering" *Smart Mater. Struct.* 18:125023 (2009) pp. 1-19.
Rose, J.L. "Successes and Challenges in Ultrasonic Guided Waves for NDT and SHM" *Proc. Nat. Sem. Exhib. Non-Destr. Eval.* (2009) pp. 1-11.
Rose, J.L. "Ultrasonic waves in solid media—Chapter 8: Waves in Plates" *Cambridge University Press* (1999) 101-114.
Rose, et al. "A Comb Transducer Model for Guided Wave NDE" *Ultrasonics* 36 (1998) pp. 163-169.
Senesi, et al. "Experimental Characterization of Periodic Frequency Steerable Arrays for Structural Health Monitoring" *Smart Mater. Struct.* 19:055026 (2010) pp. 1-11.
Seung, et al. "Development of an Omni-Directional Shear-Horizontal Wave Magnetostrictive Patch Transducer for Plates" *Ultrasonics* 53 (2013) pp. 1304-1308.
Shandiz, et al. "Low Frequency Ultrasonic Images Using Time Domain SAFT in Pitch-Catch Method" *Nondestructive Testing* 4(11) (1999) pp. 1-6.
Shandiz, et al. "A New SAFT Method in Ultrasonic Imaging at Very Low Frequencies by Using Pulse Echo Method" *Nondestructive Testing* 4(11) (1999) pp. 1-6.
Sicard, et al. "Guided Lamb Waves and L-SAFT Processing Technique for Enhanced Detection and Imaging of Corrosion Defects in Plates with Small Depth-to-Wavelength Ratio" *IEEE Trans. Ultrason. Ferroelectr. Freq. Control* 51 (2004) pp. 1287-1297.
Sicard, el al. "A Saft Algorithm for Lamb Wave Imaging of Isotropic Plate-Like Structures" *Ultrasonics* 39 (2002) pp. 487-494.
Sohn, et al. "Delamination detection in composites through guided wave field image processing" *Composites Sci. Techn.* 71(9) (2011) pp. 1250-1256. (Abstract only).
Staszewski, et al. "Health Monitoring of Aerospace Composite Structures—Active and Passive Approach" *Comp. Sci. Techn.* 69 (2009) pp. 1678-1685.
Stepinski, T. "An Implementation of Synthetic Aperture Focusing Technique in Frequency Domain" *IEEE Trans. Ultrason. Ferroelectr. Freq. Control* 54(7) (2007) pp. 1399-1408.
Sundararaman et al. "Biologically Inspired Structural Diagnostics through Beamforming with Phased Transducer Arrays" *Intl. J. Eng. Sci.* 43 (2005) pp. 756-778.
Sundararaman, et al. "Structural Damage Identification in Homogeneous and Heterogeneous Structures Using Beamforming" *J. Struct. Health Mon.* 4(2) (2005) pp. 171-190.
Sundararaman, et al. "Phased Transducer Arrays for Structural Diagnostics Through Beamforming" *Proc. 17th Tech. Conf. Am. Comp.* 177 (2002) pp. 1-10.
Swift, et al. "Generation of a Steerable Ultrasonic Beam Using a Phased Array of Low Power Semiconductor Laser Sources and Fiber Optic Delivery" *Smart Mater. Struct.* 16 (2007) pp. 728-732.
Tian, et al. "Damage Detection in Thick Steel Plates Using Guided Ultrasonic Waves and Non-Contact Laser Vibrometry" *ASME Pressure Vessels and Piping Conference* (2016) (Abstract only).
Tian, et al. "Guided wave imaging for detection and evaluation of impact-induced delamination in composites" *Smart Mater. Struct.* 24(10):105019 (2015) (Abstract only).
Tian, et al. "Lamb Wave Frequency-Wavenumber Analysis and Decomposition" *J. Intell. Mater. Sys. Struct.* 25 (2014) pp. 1107-1123.
Van Velsor, et al. "Guided-Wave Tomographic Imaging of Defects in Pipe Using a Probabilistic Reconstruction Algorithm" *Insight* 49 (2007) pp. 532-537. (Abstract only).
Velichko, et al. "Guided Wave Arrays for High Resolution Inspection" *J. Acoust. Soc. Am.* 123 (2008) pp. 186-196. (Abstract only).
Vishnuvardhan, et al. "Structural Health Monitoring of Anisotropic Plates Using Ultrasonic Guided Wave STMR Array Patches" *NDT&E Int.* 42 (2009) pp. 193-198.
Wang, et al. "Group Velocity and Characteristic Wave Carves of Lamb Waves in Composites: Modeling and Experiments" *Comp. Sci. Techn.* 67 (2007) pp. 1370-1384.
Wang, et al. "A synthetic time-reversal imaging method for structural health monitoring" *Smart Mater. Struct.* 13(2) (2004) pp. 415-423.
Wang, et al. "The Use of Piezoceramic Transducers for Smart Structural Testing" *J. Intell. Mater. Sys. Struct.* 11(9) (2000) pp. 713-724.
Wilcox, et al. "Omnidirectional Guided Wave Inspection of Large Metallic Plate Structures Using an EMAT Array" *IEEE Trans. Ultrason. Ferroelectr. Freq. Control* 52 (2005) pp. 653-665.
Wilcox, P.D. "Omni-Directional Guided Wave Transducer Arrays for the Rapid Inspection of Large Areas of Plate Structures" *IEEE Trans. Ultrason. Ferroelectr. Freq. Control* 50 (2003) pp. 699-709.

(56) References Cited

OTHER PUBLICATIONS

Wooh. et al. "A Simulation Study of the Beam Steering Characteristics for Linear Phased Arrays" *J. Nondestr. Eval.* 18(2) (1999) pp. 39-57.

Wooh, et al. "Optimum Beam Steering of Linear Phased Arrays" *Wave Motion* 29 (1999) pp. 245-265.

Wooh, et al. "Influence of Phased Array Element Size on Beam Steering Behavior" *Ultrasonics* 36 (1998) pp. 737-749.

Wright, et al. "Air-coupled Lamb wave tomography" *IEEE Trans. Ultrason. Ferroelectr. Freq. Control* 44(1) (1997) pp. 53-59.

Yan, et al. "Ultrasonic guided wave imaging techniques in structural health monitoring" *J Intell. Mater. Syst. Struct.* 21(3) (2010) pp. 377-384.

Yan, et al. "Guided Wave Phased Array Beam Steering in Composite Plates" *Proc. SPIE—Health Monitor. Struct. Biol. Sys.* 6532 (2007). (Abstract only).

Yoo, et al. "Piezoelectric-Paint-Based Two-Dimensional Phased Sensor Arrays for Structural Health Monitoring of Thin Panels" *Smart Mater. Struct.* 19:075017 (2010).

Yu, et al. "Core-skin debonding detection in honeycomb sandwich structures through guided wave wavefield analysis" *J. Intell. Mater. Syst. Struct.* (2018) pp. 1-12.

Yu, et al. "Guided wave phased array beamforming and imaging in composite plates" *Ultrasonics* 68 (2016) pp. 43-53.

Yu, et al. "Crack imaging and quantification in aluminum plates with guided wave wavenumber analysis methods" *Ultrasonics* 62 (2015) pp. 203-212. (Abstract only).

Yu, et al. "Lamb Wave Structural Health Monitoring Using a Hybrid PZT-Laser Vibrometer Approach" *Struct. Health Mon.* 12 (2013) pp. 469-483.

Yu, et al. "Lamb Wave-Based Quantitative Crack Detection Using a Focusing Array Algorithm" 29 (2013) pp. 1138-1152.

Yu, et al. "In situ 2-D piezoelectric wafer active sensors arrays for guided wave damage detection" *Ultrasonics* 48(2) (2008) pp. 117-134.

Yu, et al. "Advanced signal processing for enhanced damage detection with piezoelectric wafer active sensors" *Smart Struct. Sys.* 1(2) (2005) pp. 185-215.

Zhao, et al. "Ultrasonic Lamb wave tomography in structural health monitoring" *Smart Mater. Struct.* 20(10):105002 (2011) pp. 1-10.

Zhao, et al. "Active Health Monitoring of an Aircraft Wing with Embedded Piezoelectric Sensor/Actuator Network: I. Defect Detection, Localization and Growth Monitoring" *Smart Mater. Struct.* 16 (2007) pp. 1208-1217.

Zhao, et al. "Active Health Monitoring of an Aircraft Wing with an Embedded Piezoelectric Sensor/Actuator Network: II. Wireless Approaches" *Smart Mater. Struct.* 16 (2007) pp. 1218-1225.

Zhu, et al. "Lamb Wave Generation and Reception with Time-Delay Periodic Linear Arrays: a BEM Simulation and Experimental Study" *IEEE Trans. Ultrason. Ferroelectr. Freq. Control* 46(3) (1999) pp. 654-664.

\* cited by examiner

NETWORK WAVEFIELD IMAGING METHODS FOR QUANTIFICATION OF COMPLEX DISCONTINUITY IN PLATE-LIKE STRUCTURES

CROSS REFERENCE TO RELATED APPLICATION

This application claims filing benefit of U.S. Provisional Patent Application Ser. No. 62/686,888, having a filing date of Jun. 19, 2018, entitled "Network Wavefield Imaging Methods for Quantification of Complex Discontinuity in Plate-Like Structures," which is incorporated herein by reference for all purposes.

BACKGROUND OF THE PRESENTLY DISCLOSED SUBJECT MATTER

The presently disclosed subject matter generally relates to structural health monitoring (SHM)/nondestructive evaluation (NDE), and more particularly to guided wave-based monitoring. Further, guided wave (GW) structural health monitoring (SHM)/nondestructive evaluation (NDE) per presently disclosed subject matter uses network wavefield imaging methods which combine tomography and wavefield/wavenumber imaging algorithms for imaging complex discontinuities or shapes in plate-like structures. Damage detection in metal plates (such as steel or aluminum) is performed in some instances by using guided ultrasonic waves and non-contact laser vibrometry. The presently disclosed imaging techniques provide high-resolution images of a structure discontinuity including its location, shape and/or size.

Structural health monitoring (SHM) and nondestructive evaluation (NDE) play critical roles in structural design and management since it can reduce the risk of catastrophes and improve the next generation structural design. Among various SHM/NDE methods, ultrasonic guided waves (GW) have attracted a lot of attention due to the fact they can propagate long distances in thin-wall structures with less energy loss as compared with conventional ultrasonic waves. Regarding GW SHM/NDE, intensive studies have been done in GW imaging in the most recent two decades, since it can provide a visualized image of a discontinuity in a structure. However, the image resolution obtained using such existing imaging methods is not high enough to show the complete profile of a complex discontinuity including its size, location, and especially, its shape.

Similar to tomography in medical diagnosis, multiple actuators have been employed to image plate-like structures from different angles on GW pitch-catch mode by using either time-of-flight (TOF) or amplitude of waveforms in time domain. Other GW imaging methods, such as phased array using delay-and-sum algorithm and sparse array using time-reversal principle, are also based on the pitch-catch mode.

Wavefield and wavenumber imaging are different from the previous imaging methods, which indeed are based on point-by-point measurements over the inspection area.

Lamb wave tomography has been conducted on aluminum, Plexiglas and carbon fiber reinforced polymer (CFRP) plates with circle machined off defects with different thicknesses and sizes. Imaging results showed the defect location and approximate size but could not illustrate the detailed shape of the defects. Also, Lamb wave tomography has been studied on aluminum plates with circle thickness loss defect and on composite plates with different defects such as round hole, milled circle, rectangle thickness loss and impact damage. For circle defects, tomography images can show the shape approximately, while for other more complex defects it cannot detect the detailed shape. Lamb wave tomography has been performed with circular array sensors on a 1.6-mm thick aluminum plate with different thickness thinning damage. The resulting image illustrated the defect location and the thickness thinning effect but did not show size and shape of the defects.

A GW phased array imaging method using different array setups has successfully detected and localized through-thickness crack damage and pin-hole damage. However, imaging results in such instance did not indicate the crack size or pin-hole size. Such GW phased array beamforming imaging method has also been extended to anisotropic materials, which showed that a GW array using scanning laser Doppler vibrometer technology can detect and locate simulated damage (surface bonded round quartz rod) in composite plates.

Sparse array algorithm methodology has been used for GW imaging, for example, on a pristine aluminum plate based on time-reversal principle, to locate and approximately estimate the size of structural damage.

Multipath guided wave imaging has been considered in both aluminum and CFRP plates with simulated damage using round magnets attached on the surface. Such multipath image resolution proved better than a minimum variance image method previously used, and was able to clearly locate defects, but still without showing damage shape or size.

With advancement of scanning laser Doppler vibrometer methodology, wavefield/wavenumber imaging has also been developed. One study detected and localized delamination in composites using a filtered wave field imaging method. Another employed filter reconstruction imaging and wavenumber imaging methodology to detect and quantify delamination in composites, which approximately showed the overall shape of the delamination but without showing full features of such delamination.

Other, more recent methodologies have shown wavefield imaging and filtered imaging methods which can detect and quantify core-skin debonding damage in honeycomb sandwich structures, but without showing detailed size or shape of such damage.

Such previously existing methods can variously generate a visualized image for structural discontinuity, with highlighted areas indicating the presence of the damage, its location, or roughly indicating part of the shape. However, none of such previously existing methodologies can quantify the exact shape of the discontinuity in detail, even if such discontinuities are simple in shape. While intrinsic wavenumber imaging is a significant improvement for the specific case of delamination detection, many details are still lacking and the entire defect cannot be imaged.

Relative to previously existing methodologies, no guided wave imaging exists that can effectively image the profiles of complex discontinuities in plate-like structures.

SUMMARY OF THE PRESENTLY DISCLOSED SUBJECT MATTER

Generally speaking, one broad object of the presently disclosed subject matter is to provide a superior guided wave (GW) network imaging method which not only achieves damage detection and localization, but which also provides for detailed quantification and visualization of a complex structural discontinuity. More specifically, it is another object of the presently disclosed subject matter to effectively combine advantages of multi-path inspection of tomography together with intrinsic wave information of wavefield/wavenumber imaging methods, and to achieve a superior GW network imaging method to detect and quantify the full features of structural discontinuities having complexities.

Another present object is to in some instances provide network wavefield imaging methods which are able to image significantly complex discontinuities or shapes in plate-like structures for superior ultrasonic structural health monitoring (SHM)/nondestructive evaluation (NDE). Accordingly, in such instances, it is an object to provide imaging techniques which in turn provide inspectors high-resolution images of a discontinuity in a structure being tested including its location, shape and/or size.

Another broader object, in some instances, is to provide methods which achieve high quality images of discontinuities for more complicated profiles. In some such instances, it is an object to make use of guided wave (GW) network wavefield imaging methods which to a degree combine tomography and wavefield/wavenumber imaging algorithms. In some such instances, it is an object to provide algorithms which account for multiple actuator-excitations from different angles enclosing a discontinuity for imaging, with algorithms using intrinsic wave characteristics such as wavefield, wavenumber, or reconstructed wave energy.

In one exemplary embodiment of presently disclosed subject matter, a guided wave SHM/NDE network wavefield imaging methodology combines tomography and wavefield/wavenumber imaging in order to detect and quantify relatively more complex discontinuities in plate-like structures. In some instances, such imaging methodology takes advantage of multiple inspection paths and uses intrinsic wave information for high resolution imaging.

In certain presently disclosed exemplary embodiments, it is desired to provide: the ability to provide guided wave images from different angles enclosing a discontinuity in order to show such discontinuity feature from that view; the ability to generate a guided wave image for discontinuities with complex profiles or shapes in plate-like structures; and the ability to detect, locate, and quantify discontinuities with complex profiles or shapes in plate-like structures. In such instances, such complexities may include but are not limited to irregular shapes, compound profiles, and multiple discontinuities.

In yet other presently disclosed exemplary embodiments, it is desired to provide the ability to perform reliable guided SHM/NDE inspection using different actuators including but not limited to lead zirconate titanate (PZT) transducers, pulsed lasers, electromagnetic acoustic transducers (EMAT's), air-coupled transducer (ACT's) and the like, and using different sensors, including, but not limited to, high spatial resolution sensors SLDV, or motion controlled scanning sensors EMAT and/or ACT or the like.

In yet other objects, it is desired to obtain the advantage per practice of the presently disclosed subject matter of the subject imaging methodology that detection and high-resolution quantification of complex discontinuity in plate-like structures is obtained, as well as for multiple discontinuities since the enclosure setup of actuators can provide views from different angles for the final imaging synthesis.

In some presently disclosed exemplary embodiments, the subject guided wave (GW) imaging methods can provide high-resolution images of discontinuities with more complicated profiles in plate-like structures, such as complex shapes and multiple discontinuities. Such exemplary embodiments may be particularly useful to structural health monitoring (SHM)/nondestructive evaluation (NDE) situations, such as in damage detection and quantification, and quality control and evaluation of plate-like products. Other specific applications may include plate-like product manufactures in aerospace, automotive, energy generation, and other related industries that are required to evaluate structural damage and to assure the safety of their products.

One exemplary embodiment of presently disclosed subject matter relates to methodology for structural health monitoring (SHM)/nondestructive evaluation (NDE) testing of a plate-like structure to detect discontinuities therein. Such exemplary methodology preferably comprises: providing a plurality of guided ultrasonic wave actuators; arranging such plurality of actuators in different networks to enclose a designated scanning area of a target plate structure to be checked for a potential discontinuity therein; selectively exciting such actuators to produce guided waves in such structure to be tested; measuring a wavefield $v(t,x)$ of guided waves in such structure generated upon excitation of the respective plurality of actuators; and creating a synthetic image based on such wavefield $v(t,x)$, to detect a discontinuity in such plate structure within such scanning area.

Another exemplary embodiment of presently disclosed subject matter relates to methodology for enhanced imaging for detection and quantification of complex discontinuities in metallic plate-like structures. Such exemplary methodology preferably comprises: providing a plurality of guided ultrasonic wave actuators comprising respective transducers; arranging such plurality of actuators to enclose a designated scanning area of a target plate structure to be checked for a potential damage discontinuity therein, with such actuators each arranged at respectively different angles from a reference point relative to the scanning area; selectively exciting such actuators to produce guided waves in such structure to be tested; using a non-contact scanning laser Doppler vibrometer (SLDV) to measure a wavefield $v(t,x)$ of guided waves in such structure generated upon excitation of the respective plurality of actuators; and using intrinsic wave characteristics of such measured wavefield to create a synthetic image comprising wavefield and/or wavenumber information of determined locations and sizes of high intensity areas in correlation with location, size, and shape of damage discontinuities in a target plate structure.

It is to be understood from the complete disclosure herewith that the presently disclosed subject matter equally relates to both apparatus and corresponding and related methodology. One exemplary such apparatus relates to apparatus for structural health monitoring (SHM)/nondestructive evaluation (NDE) testing of a plate-like structure to detect discontinuities therein. Such apparatus preferably comprises: a plurality of guided ultrasonic wave actuators, arranged on a target plate structure to be checked for a potential discontinuity therein, so as to enclose a designated scanning area of such structure; selective actuators to excite guided waves in such structure to be tested; means for measuring a wavefield $v(t,x)$ of guided waves in such structure generated upon excitation of the respective plurality of actuators; and processing means for creating a synthetic image based on such wavefield $v(t,x)$, to detect a discontinuity in such plate structure within such scanning area.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

BRIEF DESCRIPTION OF THE FIGURES

A full and enabling disclosure of the presently disclosed subject matter, including the best mode thereof, to one of ordinary skill in the art, is set forth more particularly including the specification, and including reference to the accompanying figures in which.

Figure 1:
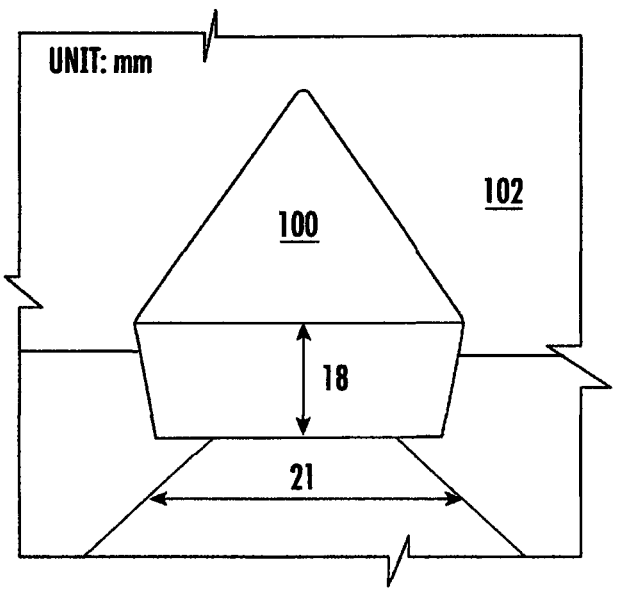
FIG. 1 is a generally top and side perspective view of a representative first discontinuity which may be identified in accordance with the presently disclosed subject matter.

Repeat use of reference characters in the present specification and drawings is intended to represent the same or analogous features or elements or steps of the presently disclosed subject matter.

DETAILED DESCRIPTION OF THE PRESENTLY DISCLOSED SUBJECT MATTER

Reference will now be made in detail to various embodiments of the presently disclosed subject matter, one or more examples of which are set forth below. Each embodiment is provided by way of explanation of the subject matter, not limitation thereof. In fact, it will be apparent to those skilled in the art that various modifications and variations may be made in the presently disclosed subject matter without departing from the scope or spirit of the subject matter. For instance, features illustrated or described as part of one embodiment, may be used in another embodiment to yield a still further embodiment, and corresponding and/or associated methodologies may be practiced relative to apparatus disclosed and/or suggested herewith, all of which comprise various embodiments of the presently disclosed subject matter.

As discussed, relatively improved guided wave (GW) structural health monitoring (SHM)/nondestructive evaluation (NDE) results from practice of the network wavefield imaging methods disclosed herewith which variously combine tomography and wavefield/wavenumber imaging algorithms. Such improved methodologies result in useful imaging of relatively significantly more complex discontinuities or shapes in plate-like structures. The presently disclosed imaging techniques can provide users high-resolution images of one or more discontinuities in a structure including its location, size and shape. Further, the presently disclosed methods can provide high quality images of discontinuities with more complicated profiles.

Presently disclosed algorithms advantageously account for multiple actuator-excitations from different angles enclosing a discontinuity for imaging, with exemplary such algorithms advantageously using intrinsic wave characteristics such as (but not limited to) wavefield, wavenumber, or reconstructed wave energy. Results include simultaneous improvement in both resolution (compared with prior GW imaging methods) and in functioning with circumstances where a target discontinuity is relatively more complicated.

For some presently disclosed embodiments, advantages reside in detection and high-resolution quantification of a complex discontinuity in plate-like structures, as well as the ability to so detect multiple of such discontinuities since the enclosure setup of actuators can provide views from different angles for the final imaging synthesis.

As referenced, various of presently disclosed embodiments for GW SHM/NDE network wavefield imaging methodologies make use of combining certain concepts of tomography with wavefield/wavenumber imaging, to obtain reliable inspection and quantification of complex discontinuities in plate-like structures. Further advantageously, in accordance with presently disclosed subject matter, subject algorithms can be implemented per different exemplary embodiments with different types of sensors and sensing systems to perform damage inspection in plate-like structures.

Different exemplary algorithm embodiments are disclosed herewith for presently disclosed synthetic guided wave SHM/NDE network wavefield imaging methods. A first example relates to a presently disclosed guided wave network wavefield imaging method. An initial aspect is based on the use of wavefield data. In this instance, velocity wavefield data v(t,x) can be obtained using a scanning sensing system, where $\underline{t}$ is time and x is the spatial vector. Various scanning approaches and/or specific devices may be practiced in accordance with presently disclosed subject matter, as further discussed herein. The following portion of this disclosure initially addresses specific algorithmic aspects of the subject network wavefield imaging exemplary method as presently disclosed.

Once such velocity wavefield data v(t,x) is obtained using a scanning sensing system as disclosed herein, a resulting wavefield image can be represented by amplitude, magnitude, and by an energy map. Per the presently disclosed subject matter, the terminology "magnitude" is intended to be defined as the maximum absolute value of the waveform at each point x, which can be expressed by the following Eq. (1) (with the term "equation" used interchangeably with "algorithm" herewith):

$$v_{mag}(x) = \max(\text{abs}(v(t,x))) \tag{1}$$

When N number of actuators are employed for enclosing a possible target discontinuity (or an area or region which will be checked for the existence of any such discontinuity or discontinuities), and guided wave (GW) excitation is used from different directions in the system, N wavefield data $v^i(t,x)$ are obtained for each actuator sent excitations in round-robin. Meanwhile, using Eq. (1) herewith, N magnitude images $v^i_{mag}(x)$ are obtained, where i=1 . . . N. The synthesis aspect of this exemplary embodiment of the presently disclosed subject matter is performed as a summation represented in this instance by Eq. (2) herewith, as follows:

$$v_{sum}(x) = \sum_{i=1}^{N} v^i_{mag}(x) \tag{2}$$

It should be understood that various alternative embodiments of the presently disclosed subject matter may make use of a synthesis process which has a final synthesis aspect based on mathematical function other than summation. For example, mathematical forms such as the use of multiplication or weighting factors may be used in place of direct summation, and all such variations are intended to come within the spirit and scope of the presently disclosed subject matter. It should be further understood that various implementations of general purpose computers and/or specific application computers, programmed with algorithms/equations disclosed herewith, may comprise various embodiments of processing means (or processors or other hardwired or programmable devices) disclosed herewith for creating a synthetic image based on such wavefield v(t,x), to detect a discontinuity in said plate structure within said scanning area.

A second exemplary embodiment of guided wave SHM/NDE network wavefield imaging methodology disclosed herewith relates to a presently disclosed synthetic guided wave wavenumber imaging method. With obtained wavefield data v(t,x) comprising data in a time-space domain, space-frequency-wavenumber representation of such data in a frequency and wavenumber domain together with the spatial information can be determined per Eq. (3), as follows:

$$S(\bar{x}, f, k) = \int_{-\infty}^{\infty}\int_{-\infty}^{\infty} v(t, x) W(t, x-\bar{x}) e^{-j(2\pi ft - k \cdot x)} dt dx \tag{3}$$

where $\bar{x}$ is the retained spatial vector $(\bar{x}, \bar{y})$, f is the frequency, k is the wavenumber vector $(k_x, k_y)$. W(x) is constructed using a Hanning function as, $$W(x) = \begin{cases} 0.5\left[1 + \cos\left(2\pi \frac{|x|}{D_x}\right)\right] & \text{if } |x| \le D_x/2 \\ 0 & \text{otherwise} \end{cases} \tag{4}$$

For each spatial location, a wavenumber vector $k^*(\bar{x},f)$ is determined by corresponding to the largest value of $|S(\bar{x}, f, k)|$ as, $$k^*(\bar{x}, f) = \underset{k}{\text{argmax}} |S(\bar{x}, f, k)| \tag{5}$$

At a selected frequency range, the spatial wavenumber image $k^*(\bar{x})$ is determined as follows, per Eq. (6):

$$k^*(\bar{x}) = \frac{1}{N}\sum_{i=1}^{N} |k^*(\bar{x}, f_i)| \tag{6}$$

where $f_i$ (i=1, 2, 3 . . . N) is the selected frequency band centered at the desired frequency $f_0$, which corresponds to the particular guided wave mode.

When N number of actuators are employed for enclosing a possible target discontinuity (or an area or region which will be checked for the existence of any such discontinuity or discontinuities), and guided wave (GW) excitation is used from different directions in the system, N wavenumber images $k_i^*(\bar{x})$ are obtained using the space-frequency-wavenumber representation method based on Eq. (6) herewith, where i=1 . . . N. The synthesis aspect of this exemplary embodiment of the presently disclosed subject matter is performed as a summation for the wavenumber image, represented in this instance by Eq. (7) herewith, as follows:

$$k^*_{sum}(\bar{x}) = \sum_{i=1}^{N} k_i^*(\bar{x}) \tag{7}$$

As with the first exemplary embodiment, other forms of mathematical synthesis such as the use of multiplication or weighting factors may be used in place of the direct summation approach of Eq. (7) herewith.

A third exemplary embodiment of guided wave SHM/NDE network wavefield imaging methodology disclosed herewith relates to a presently disclosed synthetic guided wave filtering reconstructed energy-based imaging method. Using such filter reconstruction imaging method, based on the wavefield data v(t,x) the frequency-wavenumber representation is determined by Eq. (8) herewith, as follows:

$$v(f, k) = \int_{-\infty}^{\infty}\int_{-\infty}^{\infty} v(t, x) e^{-j(2\pi ft - k \cdot x)} dt dx \tag{8}$$

In this instance, per the exemplary embodiment disclosed herewith, a filter F(f, k) is designed to retain the additional wavenumber components in order to obtain the resulting filtered spectrum $V_F(f,k)$. Such filtering process may be performed, for example, as the algorithm or Eq. (9) herewith, as follows:

$$V_F(f,k) = V(f,k) F(f,k) \tag{9}$$

Waves corresponding to the filtered spectrum $V_F(f,k)$ are determined by Eq. (10) herewith, as follows:

$$v_F(t, x) = \frac{1}{(2\pi)^2} \int_{-\infty}^{\infty}\int_{-\infty}^{\infty} v(f, k) e^{j(2\pi ft - k \cdot x)} df dk \tag{10}$$

An energy map to show energy change due to a discontinuity (within the enclosed, targeted area being scanned) may be constructed through use of Eq. (11) herewith, as follows:

$$E_F(x) = \int_0^t \frac{1}{2} v_F^2(\tau, x) d\tau \quad (11)$$

A synthetic energy map in accordance with the presently disclosed exemplary embodiment (using a summation approach) may be obtained from the summation of the energy map $E_F^i(x)$, as provided by Eq. (12) herewith, as follows:

$$E_F^{sum}(x) = \sum_{i=1}^{N} E_F^i(x) \quad (12)$$

As with the first and second exemplary embodiments, other forms of mathematical synthesis such as the use of multiplication or weighting factors may be used in place of the direct summation approach of Eq. (12) herewith.

Proof-of-concept experiments have been successfully performed in the context of achieving detection of complex discontinuity subject matter. Specifically, an exemplary embodiment of the presently disclosed subject guided wave SHM/NDE network wavefield imaging method shows the ability to detect and quantify a simulated complex discontinuity in a 1-mm aluminum 2024-T3 plate. In this instance, use of the term "simulated" is with reference to the fact that the subject or target being detected has been deliberately created and placed relative to the subject target plate, as opposed to being a discontinuity that inadvertently formed during fabrication of the plate. Other than that context, the "simulated" discontinuity is certainly a literal and real discontinuity relative to the otherwise existent plate.

Different simulated discontinuities with different shapes such as cube, square tube, triangle bar, quartz rod and plastic letters, etc. may be bonded on a target or demonstration surface.

FIG. 1 is a generally top and side perspective view of a representative first discontinuity generally 100 which may be identified in accordance with the presently disclosed subject matter. More specifically, the exemplary structure ("simulated" discontinuity) comprises an 18-mm thick equilateral triangle bar with 21-mm side lengths, glued on a target plate surface 102.

Figure 2:
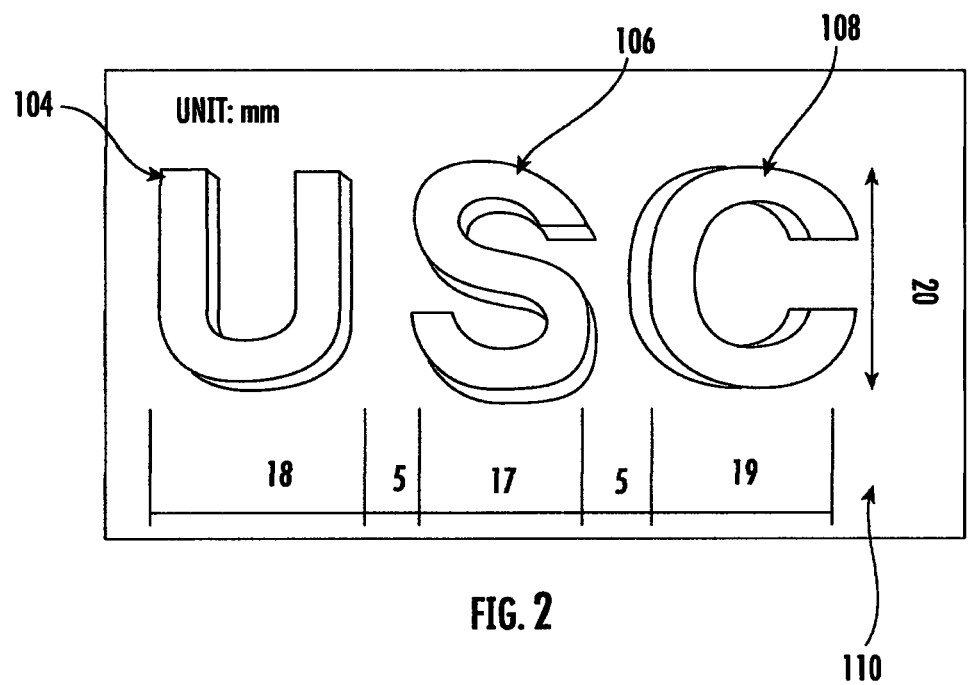
FIG. 2 is a generally top plan view of a representative second discontinuity which may be identified in accordance with the presently disclosed subject matter.

FIG. 2 is a generally top plan view of a representative second discontinuity which may be identified in accordance with the presently disclosed subject matter. More specifically, such exemplary structure ("simulated" discontinuity) comprises in fact three separate structures each with 20-mm height, 10-mm thickness and about 18-mm width. As illustrated, they comprise the three letters "U", "S", and "C" marked respectively as structures 104, 106, and 108, each glued on plate surface 110.

Figure 3A:
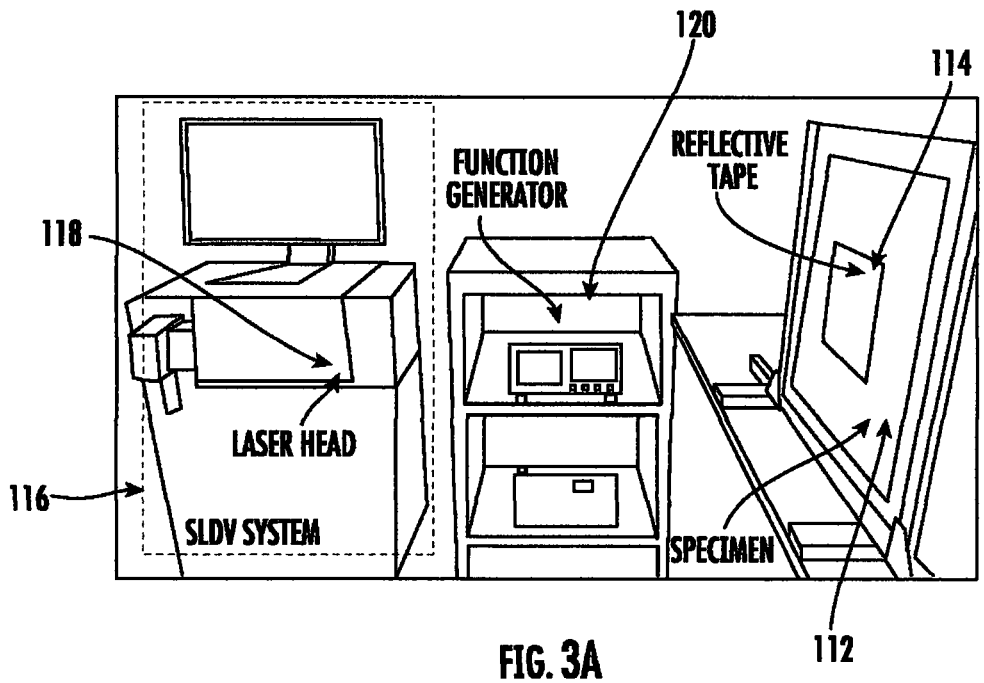
FIGS. 3A and 3B are an illustration and schematic diagram, respectively, of exemplary arrangements for practicing presently disclosed imaging methodology.
Figure 3B:
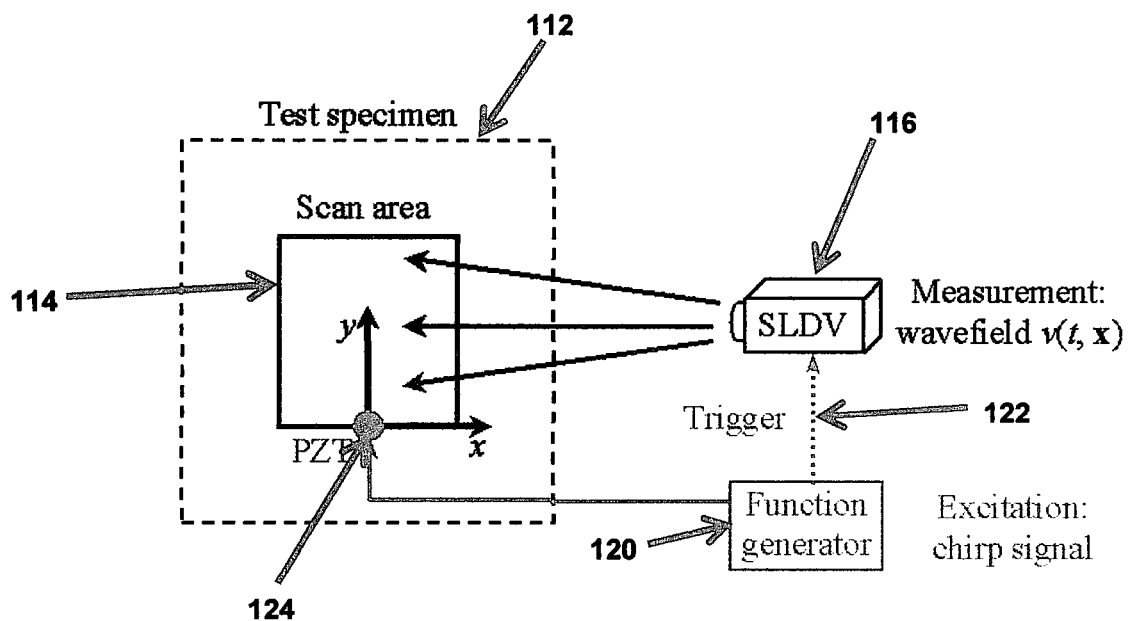
Figure 4:
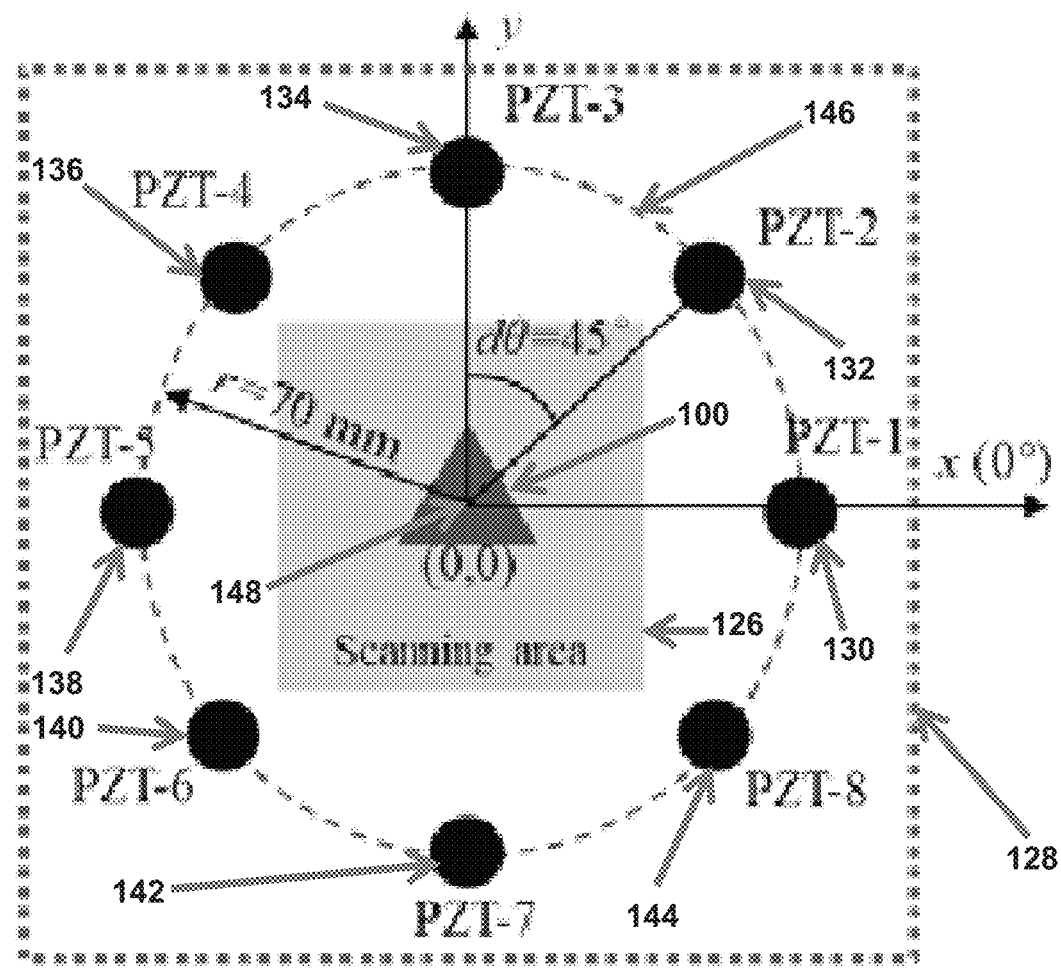
FIG. 4 is a schematic diagram of multiple actuators placed relative to the representative first discontinuity of subject FIG. 1 herewith, for being imaged in accordance with presently disclosed subject matter.

FIGS. 3A, 3B, and 4 represent demonstration (or experimental setups) for presently disclosed subject matter. For example, FIGS. 3A and 3B are an illustration and schematic diagram, respectively, of exemplary arrangements for practicing presently disclosed imaging methodology. FIG. 4 is a schematic diagram of multiple actuators placed relative to the representative first discontinuity of subject FIG. 1 herewith, for being imaged in accordance with presently disclosed subject matter.

FIGS. 3A and 3B represent an exemplary test specimen (plate) generally 112, having a target scan area generally 114 (denoted in FIG. 3A with reflective tape). As represented particularly by FIG. 3B, a grid coordinate system x, y may be used for indicating and/or determining horizontal and vertical positions on the test specimen relative to a reference point.

A non-contact scanning laser Doppler vibrometer (SLDV) generally 116 with laser head 118, as shown variously in both FIGS. 3A and 3B, may be used as a guided wave (GW) receiver over an area of 70 mm×70 mm with 1-mm spatial resolution. A function generator generally 120 may provide a trigger (such as an excitation chirp signal) generally 122 to actuate the SLDV, as well known. General operational details of using an SLDV are well known to one of ordinary skill in the art and can be found in readily available literature on such subject matter, such as follows. See, for example:

Sohn, H., Dutta, D., Yang, J. Y., Park, H. J., DeSimio, M., Olson, S. and Swenson, E., "Delamination detection in composites through guided wave field image processing," *Composites science and technology*, vol. 71, No. 9, pp. 1250-1256, 2011.

Yu, L., Tian, Z. and Leckey, C. A., "Crack imaging and quantification in aluminum plates with guided wave wavenumber analysis methods," *Ultrasonics*, vol. 62, pp. 203-212, 2015.

Tian, Z., Yu, L., Leckey, C. and Seebo, J., "Guided wave imaging for detection and evaluation of impact-induced delamination in composites," *Smart Materials and Structures*, vol. 24, No. 10, pp. 105019, 2015.

Yu, L., Tian, Z., Li, X., Zhu, R. and Huang, G., "Core-skin debonding detection in honeycomb sandwich structures through guided wave wavefield analysis," *Journal of Intelligent Material Systems and Structures*, pp. 1045389X18758180, 2018.

FIG. 3B also represents placement of an exemplary actuator generally 124 relative to scan area generally 114. Thus, such FIG. 3B provides a schematic of an exemplary sensing system for acquiring wavefields of guided waves. In this instance, such exemplary actuator may serve as the representative reference point for the mentioned x, y coordinate system. Also, it may comprise in this exemplary embodiment a lead zirconate titanate (PZT) transducer. The inspection system uses a PZT wafer as the actuator to generate interrogation guided waves and an SLDV as the receiver to receive diagnosis guided waves in the scan area. The SLDV is a rapid, high spatial resolution and non-contact means for guided wave sensing and wave propagation visualization. Thus, an SLDV is one example of means for measuring a wavefield v(t,x) of guided waves in said structure generated upon excitation of the respective plurality of actuators, in accordance with presently disclosed subject matter. In particular, such means for measuring may include a non-contact scanning laser Doppler vibrometer (SLDV) for measuring the wavefield v(t,x) of guided waves in said structure, based on the Doppler effect. As known and understood by those of ordinary skill in the art, displacement and velocity components of guided waves at scan points of the SLDV can be acquired based on the Doppler effect on light waves. A laser Doppler vibrometer, even if having only one laser beam, can direct the laser beam to various locations for measurements, by employing two moving scanning mirrors driven by galvanometric actuators.

The spatial resolution of scanning is related to the standoff distance (distance between laser head and test object) and the angular resolutions of the scanning mirrors. For example, for a Polytec PSV-400-M2 device, angular resolutions of the two scanning mirrors are less than 0.002°, which allow achieving high spatial resolutions. Through point-by-point measurement of guided waves at multiple scanning points on a predefined scan grid, the SLDV acquires a velocity wavefield v(t, x) of guided wave propagation as a function of both time t and space x.

The presently disclosed subject matter provides the ability to perform reliable guided SHM/NDE inspections using different actuators including, but not limited to, lead zirconate titanate (PZT) transducers, pulsed lasers, electromagnetic acoustic transducers (EMAT's), or air-coupled transducer (ACT's) and the like. Likewise, while an SLDV arrangement is illustrated, presently disclosed methodologies may be practiced using different sensors including but not limited to high spatial resolution sensors SLDV, or motion controlled scanning sensors EMAT and/or ACT or the like.

As noted, FIG. 4 is a schematic diagram of multiple actuators placed relative to the representative first discontinuity generally 100 of subject FIG. 1 herewith, for being imaged in accordance with presently disclosed subject matter, relative to scanning area 126 of a test specimen 128. In other words, FIG. 4 represents an experimental test setup to detect a triangle shape discontinuity generally 100 in an aluminum plate 128.

As illustrated in the exemplary arrangement of present FIG. 4, in accordance with presently disclosed subject matter, there are eight (8) respective PZT transducers PZT-1 through PZT-8 (generally 130 through 144, respectively) which are bonded onto the surface of specimen 128. As shown, they are preferably in this exemplary embodiment arranged in a circle generally 146 enclosing the simulated discontinuity 100, with the specimen center (and also the circle center) generally 148 set as the coordinate origin, or (0, 0) reference. As will be understood by those of ordinary skill in the art, the actuators are used to generate guided waves. As an example only, a PZT excitation signal of a 3-cycle toneburst at 120 kHz may be used.

Once the $i^{th}$ PZT is actuated, wavefield data $v_i(t,x)$ is obtained over the SLDV scanning area generally 126. Also, the wavefield image $v_{mag}^i(x)$, wavenumber image $k_i^*(\bar{x})$, and filter reconstructed energy-based image $E_F^i(x)$ are obtained using algorithms as otherwise described herein.

All eight PZT actuators 130 through 144 are, in turn, actuated for the SLDV generally 116 to collect the wavefield data and for the algorithms to, in turn, process such data to generate the images. With image data for each respective PZT in hand, the wavefield image $v_{mag}^{sum}(x)$, the wavenumber image $k_{sum}^*(\bar{x})$, and the filter reconstructed energy-based image $E_p^{sum}(x)$ are obtained. As understood from the complete disclosure herewith, such information allows the user to quantify the overall features of a detected discontinuity, including its location, size, and shape.

Figure 5A:
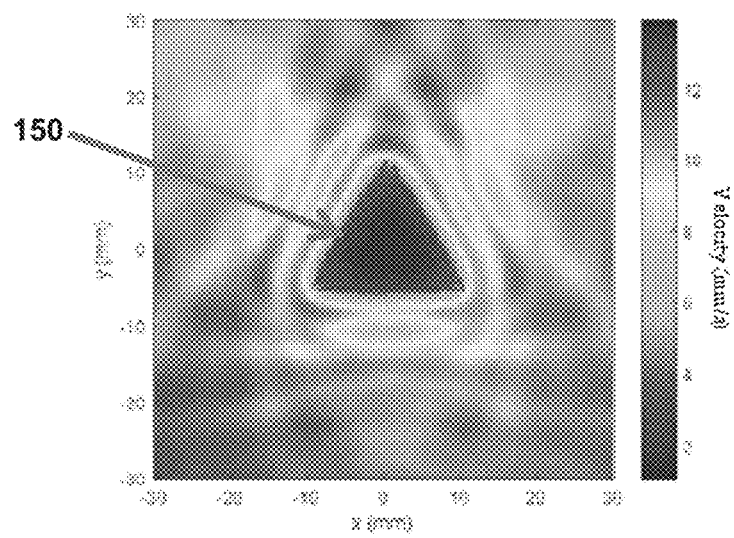
FIGS. 5A, 5B, and 5C are respective images of the representative first discontinuity of subject FIG. 1 as obtained with various embodiments of the presently disclosed subject matter.
Figure 5B:
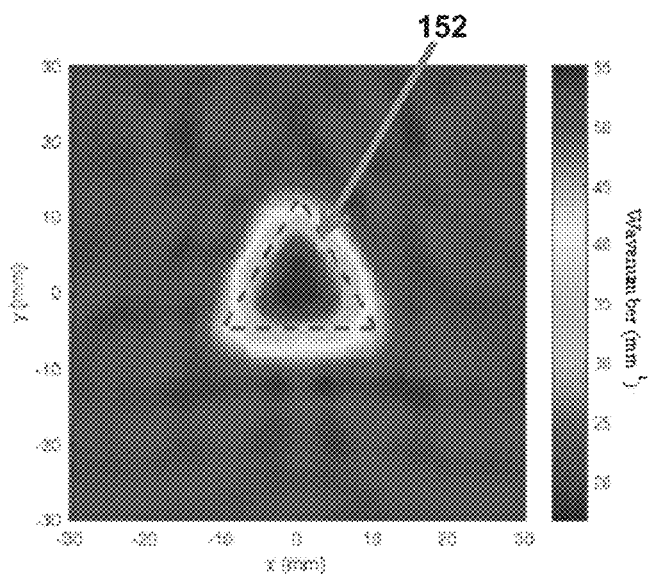
Figure 5C:
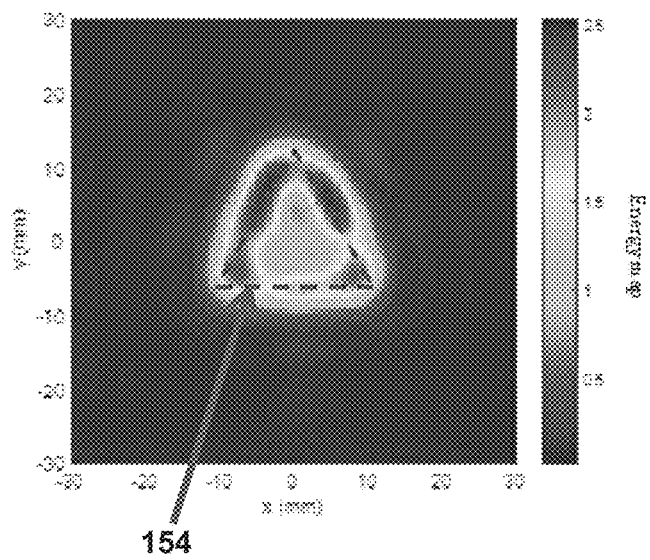

FIGS. 5A, 5B, and 5C are respective synthetic images of the representative first discontinuity generally 100 of subject FIG. 1 as obtained with various embodiments of the presently disclosed subject matter. More particularly, FIGS. 5A, 5B, and 5C synthetic images for the representative triangle-shaped discontinuity 100 are formed, respectively, through (a) wavefield imaging; (b) wavenumber imaging; and (c) filter reconstructed energy-based imaging methodologies of presently disclosed subject matter.

The physical positions of triangular discontinuity generally 100 of subject FIG. 1 are shown as dotted-line overlays (for demonstration and disclosure purposes only) for the images of FIGS. 5A, 5B, and 5C. Specifically, dotted-line overlay representations 150, 152, and 154, respectively, represent a high correlation of the highlighted portion of the generated synthetic image with the real discontinuity generally 100, including its location, size, and shape.

Figure 6A:
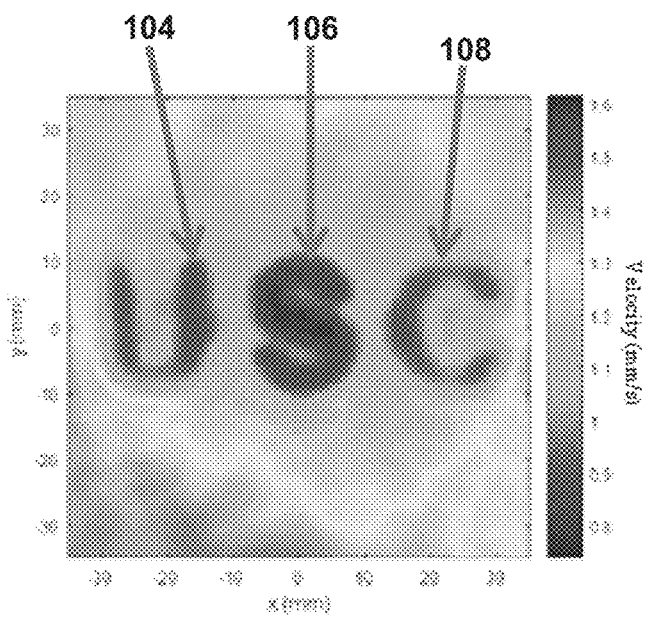
FIGS. 6A, 6B, and 6C are respective images of the representative second discontinuity of subject FIG. 2 as obtained with various embodiments of the presently disclosed subject matter.
Figure 6B:
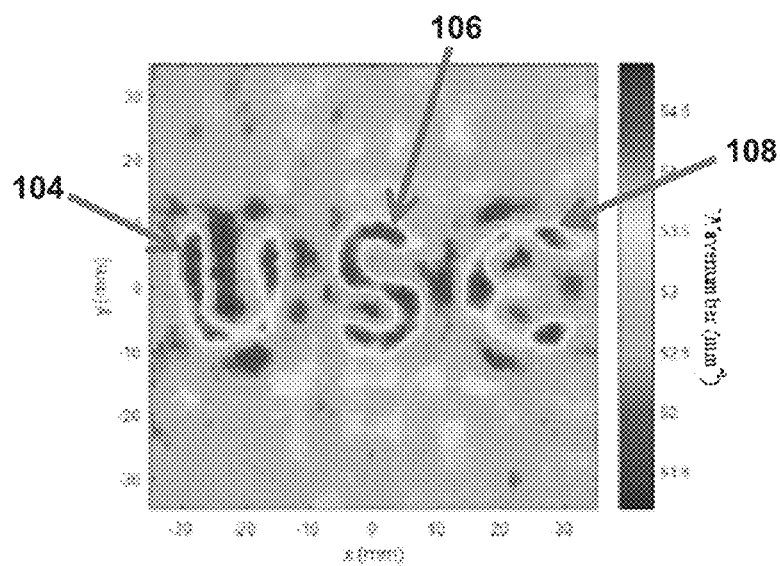
Figure 6C:
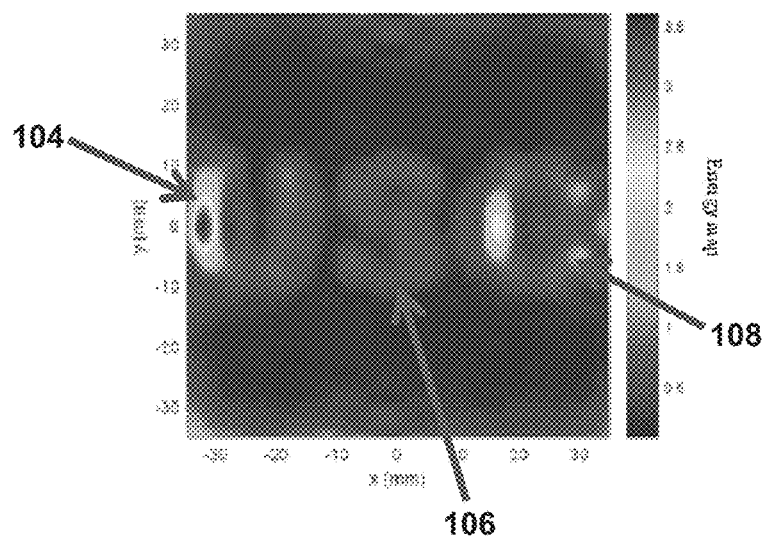
Figure 7A:
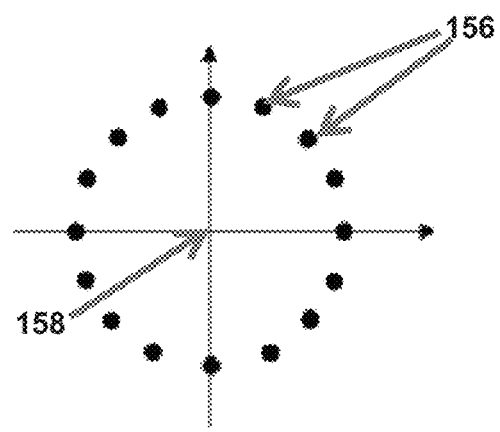
FIGS. 7A, 7B, 7C, and 7D are schematic diagrams of respective exemplary embodiments of multiple actuator placement arrangements for use in presently disclosed subject matter.
Figure 7B:
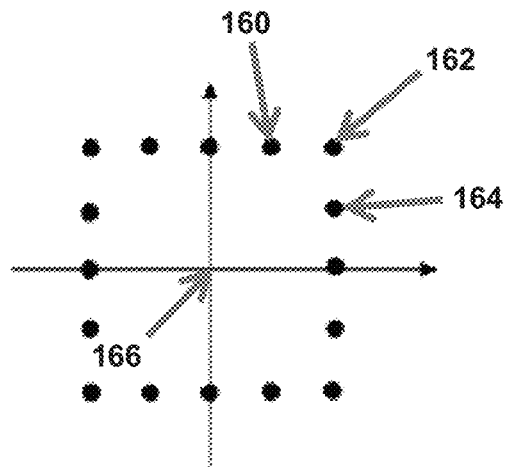
Figure 7C:
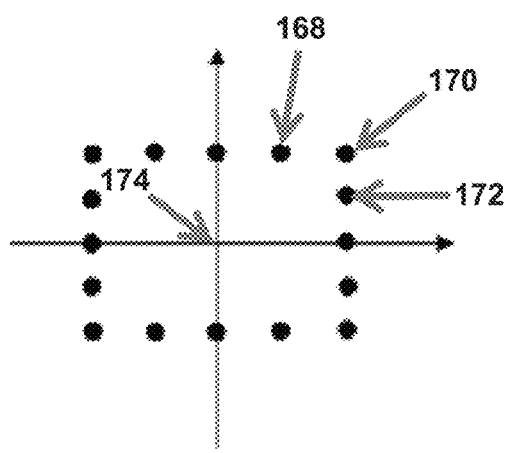
Figure 7D:
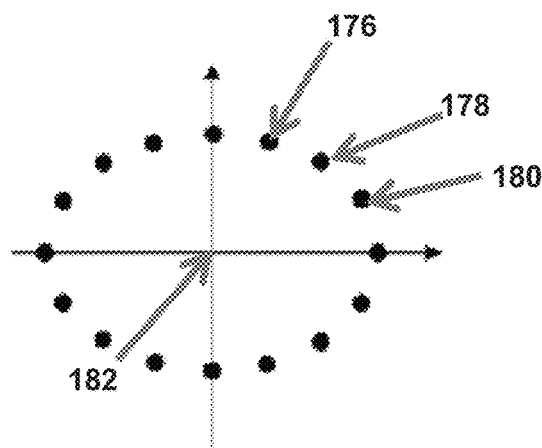

FIGS. 6A, 6B, and 6C are respective synthetic images of the representative second discontinuity (collectively, the respective multiple lettering structures "U" 104, "S" 106, and "C" 108) of subject FIG. 2 as obtained with various embodiments of the presently disclosed subject matter. More particularly, FIGS. 6A, 6B, and 6C synthetic images for the representative multi-component discontinuity (104/106/108) are formed, respectively, through (a) wavefield imaging; (b) wavenumber imaging; and (c) filter reconstructed energy-based imaging methodologies of presently disclosed subject matter.

The highlighted portions of the resulting wavefield image (FIG. 6A) and wavenumber image (FIG. 6B) all show the subject three letters 104/106/108 very clearly and match their actual/real size, location, and shape. In this instance, the filter reconstructed energy-based image (FIG. 6C) shows the overall shape and location of the letters 104/106/108 while not as clearly in this instance indicating their exact shape. Such relatively less good imaging performance for the format of FIG. 6C is potentially caused by relatively weaker interaction between detection waves and the subject discontinuity items 104/106/108 due to the relatively small line width of the letters (at only 4 mm). In accordance with the presently disclosed subject matter, relatively more accurate imaging based on filter reconstructed energy-based imaging methodology may be obtained by arranging the subject system for generating relatively higher resolution images, such as by the number and alignment of the subject presently disclosed multiple actuator arrangement.

FIGS. 7A, 7B, 7C, and 7D are schematic diagrams of respective exemplary embodiments of multiple actuator network arrangements for use in presently disclosed subject matter. In particular, FIGS. 7A, 7B, 7C, and 7D represent multiple actuator configurations which are, respectively, (a) circle, (b) square, (c) rectangle, and (d) ellipse shapes. Note the actuator arrangements are not limited to the presented configurations given here. Any network arrangement can be used as long as the discontinuity to be inspected is enclosed within.

As understood from the complete disclosure herewith, the presently disclosed subject matter makes use of specified algorithms in conjunction with synthetic guided wave imaging methodologies. The presently disclosed and referenced algorithms can be implemented in SHM/NDE systems with different market actuators including, but not limited to, PZT, pulsed laser, electromagnetic acoustic transducer (EMAT), is a transducer [22], air-coupled transducer (ACT), or similar, and different high-spatial-resolution sensors such as SLDV, or motion-controlled sensors such as ACT and EMAT, or similar.

Further, as represented in FIGS. 7A through 7D, actuators can be arranged in different configurations, such as circle (FIG. 7A), square (FIG. 7B), rectangle (FIG. 7C), ellipse (FIG. 7D), or polygon or other shapes. As shown in representative FIG. 7A, the plural represented actuators 156 are not only equi-distant from their adjacent actuators, but all the same distance from the reference or center point generally 158. With respect to each of FIGS. 7B, 7C, and 7D, however, the plural represented actuators are equi-distant from their adjacent actuators but not necessarily from the reference or center point. For example, in FIG. 7B, the distance between actuators 160 and 162 is the same as the distance between 162 and 164, while the distance between actuator 160 and center point 166 is different from the distance between actuator 162 and center point 166. Similar characteristics apply for FIGS. 7C and 7D. Compare, for example, equi-distances between 168 and 170 versus 170 and 172, but not equal distances between 168 to 174 compared with 170 to 174. Also, compare equi-distances between 176 to 178 versus 178 to 180, but not equal distances between 176 to 182 compared with 180 to 182.

Those of ordinary skill in the art from the complete disclosure herewith will understand that various actuator arrangements may be practiced with various sensors to form particular embodiments of the presently disclosed subject matter. Further, various of the network wavefield imaging methodologies disclosed herewith may be alternatively practiced with each of such embodiments to comprise yet further alternative embodiments herewith. In particular, experience of various users may show particular embodiments relatively more useful than others for detection of discontinuities typical to the context in which they practice the presently disclosed subject matter. All such variations and selective applications are intended to come with the spirit and scope of the presently disclosed subject matter.

Thus, presently disclosed subject matter provides for guided wave SHM/NDE network wavefield imaging with relatively superior resolution for complex structural discontinuities using a combined tomography and wavefield/wavenumber imaging algorithm in plate-like structures. In some instances, and in exemplary embodiments, such results are obtained through the combination of traditional and wavefield/wavenumber imaging through synthesizing algorithms and/or the use of multiple-actuators arrangements for multi-path inspection enclosing the wavefield scanning area with the discontinuity (using an approach that relatively more information can be captured using more actuators). Still further, various present exemplary embodiments make use of guided wave synthesis imaging using wavefield inspection data from different views, and others provide for complex discontinuity quantification from different angles enclosing the discontinuity. Thus, the presently disclosed subject matter in some instances helps capture discontinuity feature or features from different angles of view, for improving high-resolution synthesis images for highlighting overall discontinuity information including location, size, and shape.

Further, potential industrial applications of the presently disclosed subject matter are applicable to aviation, aerospace, and automotive engineering, where plate-like materials are heavily used. Presently disclosed guided wave network wavefield imaging methodology provides a way to quantify more complex discontinuity (singular or plural) in plate-like structures. Moreover, the presently disclosed subject matter for network wavefield imaging methodologies provides a more interactive way of online structural health mentoring of plate-like structures. By such application types, the presently disclosed network wavefield imaging methodologies can be used for reliable discontinuity inspection for plate-like structures, online structural health monitoring of plate-like structures, and quality control of plate-like structures in product design and manufacturing processes. That makes the presently disclosed subject matter potentially useful in many circumstances, such as in federal and industrial laboratories, plate-like structure manufactures, aerospace, automotive, energy generation, and related industries that are required to assure the safety of their products by structural health monitoring and nondestructive evaluation. All of the foregoing variations and potential applications are intended to come within the spirit and scope of the presently disclosed subject matter.

What is claimed is:

1. Methodology for structural health monitoring (SHM)/nondestructive evaluation (NDE) testing of a plate-like structure to detect discontinuities therein, comprising:
   providing a plurality of guided ultrasonic wave actuators;
   arranging said plurality of actuators to enclose a designated scanning area of a target plate structure to be checked for a potential discontinuity therein;
   selectively exciting said actuators to produce guided waves in said structure to be tested;
   measuring a wavefield v(t,x) of guided waves in said structure generated upon excitation of the respective plurality of actuators; and
   creating a synthetic image based on such wavefield v(t,x), to detect a discontinuity in said plate structure within said scanning area,
   wherein said synthetic image comprises wavefield and/or wavenumber information of damage induced waves for damage detection and quantification, and
   wherein creating said synthetic image includes at least one of:
   A:
   determining the maximum absolute value of the waveform at each point x, by:

$$v_{mag}(x) = \max(\text{abs}(v(t,x)));$$

exciting each actuator in turn so that a corresponding plurality of wavefield data $v^i(t,x)$ are obtained for each actuator; and
   creating data for said synthetic wavefield image through performing one of a summation, multiplication, and weighting factor synthesis of the wavefield data; or
   B:
   determining at least in part from said wavefield data a spatial wavenumber image at a selected frequency range as:

$$k^*(\overline{x}) = \frac{1}{N}\sum_{i=1}^{N}|k^*(\overline{x}, f_i)|;$$

where $f_i$ (i=1,2,3 ... N) is the selected frequency band centered at the desired frequency $f_0$, which corresponds to the particular guided wave mode, for N number of actuators; and
   creating data for said synthetic wavenumber image through performing one of a summation, multiplication, and weighting factor synthesis of the wavenumber image; or
   C:
   determining at least in part from said wavefield data a frequency wavenumber representation as:

$$v(f,k) = \int_{-\infty}^{\infty}\int_{-\infty}^{\infty}v(t,x)e^{-j(2\pi ft - k\cdot x)}dt dx;$$

conducting a filtering process on said frequency wavenumber representation to obtain a filtered spectrum as:

$$V_F(f,k) = V(f,k)F(f,k);$$

determining waves corresponding to the filtered spectrum $V_{f_F}(f,k)$ as:

$$v_F(t, x) = \frac{1}{(2\pi)^2} \int_{-\infty}^{\infty}\int_{-\infty}^{\infty} v(f, k)e^{j(2\pi ft - k\cdot x)} df dk;$$

creating an energy map to show energy change due to a discontinuity within said designated scanning area as:

$$E_F(x) = \int_0^\tau \frac{1}{2} v_F^2(\tau, x) d\tau;$$

and
creating data for said synthetic wavefield image through performing one of a summation, multiplication, and weighting factor synthesis of the energy map $E_F^i(x)$.

2. Methodology as in claim 1, wherein said respective actuators are arranged at respectively different angles from a reference point relative to the scanning area.

3. Methodology as in claim 1, wherein creating said synthetic image includes providing high-resolution images of a detected discontinuity in a structure being tested, to indicate its location, shape, and/or size in said structure.

4. Methodology as in claim 1, wherein said guided waves are generated by piezoelectric transducers, and a non-contact scanning laser Doppler vibrometer (SLDV) is used to measure the wavefield v(t,x) of guided waves in said structure, based on the Doppler effect.

5. Methodology as in claim 1, wherein said plate-like structure comprises a metal plate for industrial uses requiring detection of any potential discontinuity therein.

6. Methodology as in claim 5, wherein said plate-like structure comprises a metal plate of steel, aluminum, or metal alloys.

7. Methodology as in claim 1, wherein said guided waves are generated by at least one of lead zirconate titanate (PZT) transducers, pulsed lasers, electromagnetic acoustic transducers (EMATs), and air-coupled transducer (ACT).

8. Methodology as in claim 7, wherein sensors comprising at least one of high spatial resolution sensors SLDV, motion controlled scanning sensors EMAT or ACT are used to measure the wavefield v(t,x) of guided waves in said structure.

9. Methodology as in claim 1, wherein said actuators comprise at least one of lead zirconate titanate (PZT) transducers, pulsed lasers, electromagnetic acoustic transducers (EMATs), and air-coupled transducer (ACT); and at least one of high spatial resolution sensors SLDV, motion controlled scanning sensors EMAT or ACT are used to measure the wavefield v(t,x) of guided waves in said structure.

10. Methodology as in claim 1, wherein creating said synthetic image includes:
determining the maximum absolute value of the waveform at each point x, by:

$$v_{mag}(x) = \max(abs(v(t,x)));$$

exciting each actuator in turn so that a corresponding plurality of wavefield data $v^i(t,x)$ are obtained for each actuator; and
creating data for said synthetic wavefield image through performing one of a summation, multiplication, and weighting factor synthesis of the wavefield data.

11. Methodology as in claim 10, wherein said creating data step includes creating data for said synthetic wavefield image through performing the summation:

$$v_{sum}(x) = \sum_{i=1}^{N} v_{mag}^i(x).$$

12. Methodology as in claim 1, wherein creating said synthetic image includes:
determining at least in part from said wavefield data a spatial wavenumber image at a selected frequency range as:

$$k^*(\overline{x}) = \frac{1}{N}\sum_{i=1}^{N} |k^*(\overline{x}, f_i)|;$$

where $f_i$ (i=1,2,3 ... N) is the selected frequency band centered at the desired frequency $f_0$, which corresponds to the particular guided wave mode, for N number of actuators; and
creating data for said synthetic wavenumber image through performing one of a summation, multiplication, and weighting factor synthesis of the wavenumber image.

13. Methodology as in claim 12, wherein said creating data step includes creating data for said synthetic wavenumber image through performing the summation of the wavenumber image as:

$$k_{sum}^*(\overline{x}) = \sum_{i=1}^{N} k_i^*(\overline{x}).$$

14. Methodology as in claim 1, wherein creating said synthetic image includes:
determining at least in part from said wavefield data a frequency wavenumber representation as:

$$v(f, k) = \int_{-\infty}^{\infty}\int_{-\infty}^{\infty} v(t, x)e^{-j(2\pi ft - k\cdot x)} dt dx;$$

conducting a filtering process on said frequency wavenumber representation to obtain a filtered spectrum as:

$V_F(f,k) = V(f,k)F(f,k);$ determining waves corresponding to the filtered spectrum $V_F(f,k)$ as:

$$v_F(t, x) = \frac{1}{(2\pi)^2} \int_{-\infty}^{\infty}\int_{-\infty}^{\infty} v(f, k)e^{j(2\pi ft - k\cdot x)} df dk;$$

creating an energy map to show energy change due to a discontinuity within said designated scanning area as:

$$E_F(x) = \int_0^\tau \frac{1}{2} v_F^2(\tau, x) d\tau;$$

and
creating data for said synthetic wavefield image through performing one of a summation, multiplication, and weighting factor synthesis of the energy map $E_F^i(x)$.

15. Methodology as in claim 14, wherein said creating data step includes creating data for said synthetic wavefield image through performing the summation of the energy map $E_F^i(x)$ as:

$$E_F^{sum}(x) = \sum_{i=1}^{N} E_F^i(x).$$

16. Methodology as in claim 1, wherein said plurality of actuators are arranged in configurations which are at least one of circle, square, rectangle, and ellipse shapes.

17. Methodology for enhanced imaging for detection and quantification of complex discontinuities in metallic plate-like structures, comprising:
providing a plurality of guided ultrasonic wave actuators comprising respective transducers;
arranging said plurality of guided ultrasonic wave actuators to enclose a designated scanning area of a target plate structure to be checked for a potential damage discontinuity therein, with said actuators each arranged at respectively different angles from a reference point relative to the scanning area;
selectively exciting in turn said guided ultrasonic wave actuators to produce guided waves in said structure to be tested;
using a non-contact scanning laser Doppler vibrometer (SLDV) to measure a wavefield $v(t,x)$ of guided waves in said structure generated upon excitation of the respective plurality of actuators; and
using intrinsic wave characteristics of such measured wavefield to create a synthetic image comprising wavefield and/or wavenumber information of determined locations and sizes of high intensity areas in correlation with location, size, and shape of damage discontinuities in a target plate structure.

18. Methodology as in claim 17, wherein said plurality of actuators are arranged in configurations which are at least one of circle, square, rectangle, and ellipse shapes.

19. Methodology as in claim 17, wherein said transducers comprise at least one of lead zirconate titanate (PZT) transducers, pulsed lasers, electromagnetic acoustic transducers (EMATs), and air-coupled transducer (ACT).

20. Methodology as in claim 17, wherein said using intrinsic wave characteristics step includes using algorithms for analysis based on at least one of wavefield, wavenumber, and reconstructed wave energy characteristics.

21. Methodology as in claim 20, wherein creating said synthetic image includes:
determining the maximum absolute value of the waveform at each point x, by:

$$v_{mag}(x) = \max(abs(v(t,x)));$$

exciting each actuator in turn so that a corresponding plurality of wavefield data $v^i(t,x)$ are obtained for each actuator; and
creating data for said synthetic wavefield image through performing one of a summation, multiplication, and weighting factor synthesis of the wavefield data.

22. Methodology as in claim 21, wherein said creating data step includes creating data for said synthetic wavefield image through performing the summation:

$$V_{sum}(x) = \sum_{i=1}^{N} v_{mag}^i(x).$$

23. Methodology as in claim 20, wherein creating said synthetic image includes:
determining at least in part from said wavefield data a spatial wavenumber image at a selected frequency range as:

$$k^*(\overline{x}) = \frac{1}{N}\sum_{i=1}^{N}|k^*(\overline{x},f_i)|;$$

where $f_i$ (i=1,2,3 ... N) is the selected frequency band centered at the desired frequency $f_0$, which corresponds to the particular guided wave mode, for N number of actuators; and
creating data for said synthetic wavenumber image through performing one of a summation, multiplication, and weighting factor synthesis of the wavenumber image.

24. Methodology as in claim 23, wherein said creating data step includes creating data for said synthetic wavenumber image through performing the summation of the wavenumber image as:

$$k_{sum}^*(\overline{x}) = \sum_{i=1}^{N} k_i^*(\overline{x}).$$

25. Methodology as in claim 20, wherein creating said synthetic image includes:
determining at least in part from said wavefield data a frequency wavenumber representation as:

$$v(f,k) = \int_{-\infty}^{\infty}\int_{-\infty}^{\infty} v(t,x)e^{-j(2\pi ft - k\cdot x)}dt dx;$$

conducting a filtering process on said frequency wavenumber representation to obtain a filtered spectrum as:

$$V_F(f,k) = V(f,k)F(f,k);$$

determining waves corresponding to the filtered spectrum $V_F(f,k)$ as:

$$v_F(t,x) = \frac{1}{(2\pi)^2}\int_{-\infty}^{\infty}\int_{-\infty}^{\infty} v(f,k)e^{j(2\pi ft - k\cdot x)}df dk;$$

creating an energy map to show energy change due to a discontinuity within said designated scanning area as:

$$E_F(x) = \int_0^{\tau} \frac{1}{2}v_F^2(\tau,x)d\tau;$$

and
creating data for said synthetic wavefield image through performing one of a summation, multiplication, and weighting factor synthesis of the energy map $E_F^i(x)$.

26. Methodology as in claim 25, wherein said creating data step includes creating data for said synthetic wavefield image through performing the summation of the energy map $E_F^i(x)$ as:

$$E_F^{sum}(x) = \sum_{i=1}^{N} E_F^i(x).$$

27. Apparatus for structural health monitoring (SHM)/ nondestructive evaluation (NDE) testing of a plate-like structure to detect discontinuities therein, comprising:
a plurality of guided ultrasonic wave actuators, arranged on a target plate structure to be checked for a potential discontinuity therein, so as to enclose a designated scanning area of such structure;
means for selective operation of said guided ultrasonic wave actuators to excite in turn guided waves in said structure to be tested;
means for measuring a wavefield v(t,x) of guided waves in said structure generated upon excitation of the respective plurality of actuators; and
processing means for creating a synthetic image based on such wavefield v(t,x), to detect a discontinuity in said plate structure within said scanning area.

28. Apparatus as in claim 27, wherein said plurality of actuators are arranged in configurations which are at least one of circle, square, rectangle, ellipse shapes and/or any other shapes which can enclose the discontinuity.

29. Apparatus as in claim 27, wherein said respective actuators are arranged at respectively different angles from a reference point relative to the scanning area.

30. Apparatus as in claim 27, wherein said plate-like structure comprises a metal plate.

31. Apparatus as in claim 27, wherein:
said actuators comprise piezoelectric transducers; and
said means for measuring includes a non-contact scanning laser Doppler vibrometer (SLDV) for measuring the wavefield v(t,x) of guided waves in said structure, based on the Doppler effect.

32. Apparatus as in claim 27, wherein said actuators comprise at least one of lead zirconate titanate (PZT) transducers, pulsed lasers, electromagnetic acoustic transducers (EMATs), and air-coupled transducer (ACT).

33. Apparatus as in claim 27, wherein said synthetic image comprises wavefield and/or wavenumber information of damage induced waves for damage detection and quantification.

34. Apparatus as in claim 33, wherein:
said function generator is further operative for exciting each actuator in turn so that a corresponding plurality of wavefield data $v^i(t,x)$ are obtained for each actuator; and
said processing means includes a processor further operative for:
determining the maximum absolute value of the waveform at each point x, by:

$v_{mag}(x) = \max(\text{abs}(v(t,x)));$ and creating data for said synthetic wavefield image through performing one of a summation, multiplication, and weighting factor synthesis of the wavefield data.

35. Apparatus as in claim 34, wherein said processing means includes a processor further operative for creating data for said synthetic wavefield image through performing the summation:

$$v_{sum}(x) = \sum_{i=1}^{N} v_{mag}^i(x).$$

36. Apparatus as in claim 33, wherein said processing means includes a processor further operative for:
determining at least in part from said wavefield data a spatial wavenumber image at a selected frequency range as:

$$\overline{k^*(x)} = \frac{1}{N} \sum_{i=1}^{N} |k^*(\overline{x}, f_i)|;$$

where $f_i$ (i=1,2,3 ... N) is the selected frequency band centered at the desired frequency $f_0$, which corresponds to the particular guided wave mode, for N number of actuators; and
creating data for said synthetic wavenumber image through performing one of a summation, multiplication, and weighting factor synthesis of the wavenumber image.

37. Apparatus as in claim 36, wherein said processing means includes a processor further operative for creating data for said synthetic wavenumber image through performing the summation of the wavenumber image as:

$$k_{sum}^*(\overline{x}) = \sum_{i=1}^{N} k_i^*(\overline{x}).$$

38. Apparatus as in claim 33, wherein said processing means includes a processor further operative for:
determining at least in part from said wavefield data a frequency wavenumber representation as:

$$v(f,k) = \int_{-\infty}^{\infty} \int_{-\infty}^{\infty} v(t,x) e^{-j(2\pi ft - k \cdot x)} dt dx;$$

conducting a filtering process on said frequency wavenumber representation to obtain a filtered spectrum as:

$V_F(f,k) = V(f,k) F(f,k);$ determining waves corresponding to the filtered spectrum $V_F(f,k)$ as:

$$v_F(t,x) = \frac{1}{(2\pi)^2} \int_{-\infty}^{\infty} \int_{-\infty}^{\infty} v(f,k) e^{j(2\pi ft - k \cdot x)} df dk;$$

creating an energy map to show energy change due to a discontinuity within said designated scanning area as:

$$E_F(x) = \int_0^{\tau} \frac{1}{2} v_F^2(\tau, x) d\tau;$$

and
creating data for said synthetic wavefield image through performing one of a summation, multiplication, and weighting factor synthesis of the energy map $E_F^i(x)$.

39. Apparatus as in claim 38, wherein said processing means includes a processor further operative for creating data for said synthetic wavefield image through performing the summation of the energy map $E_F^i(x)$ as:

$$E_F^{sum}(x) = \sum_{i=1}^{N} E_F^i(x).$$

* * * * *